(12) United States Patent
Yang et al.

(10) Patent No.: US 11,195,044 B2
(45) Date of Patent: Dec. 7, 2021

(54) FULLY AUTOMATIC NATURAL IMAGE MATTING METHOD

(71) Applicant: DALIAN UNIVERSITY OF TECHNOLOGY, Liaoning (CN)

(72) Inventors: Xin Yang, Liaoning (CN); Xiaopeng Wei, Liaoning (CN); Qiang Zhang, Liaoning (CN); Yuhao Liu, Liaoning (CN); Yu Qiao, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 27 days.

(21) Appl. No.: 16/963,140

(22) PCT Filed: May 13, 2020

(86) PCT No.: PCT/CN2020/089942
§ 371 (c)(1),
(2) Date: Jul. 17, 2020

(87) PCT Pub. No.: WO2021/139062
PCT Pub. Date: Jul. 15, 2021

(65) Prior Publication Data
US 2021/0216806 A1    Jul. 15, 2021

(30) Foreign Application Priority Data
Jan. 12, 2020    (CN) .................... 202010029018.X

(51) Int. Cl.
*G06K 9/46*    (2006.01)
*G06K 9/62*    (2006.01)
(Continued)

(52) U.S. Cl.
CPC .......... *G06K 9/4628* (2013.01); *G06K 9/6234* (2013.01); *G06T 7/11* (2017.01);
(Continued)

(58) Field of Classification Search
CPC . G06T 2207/20084; G06T 2207/20081; G06T 2207/10024; G06T 7/194; G06T 7/11; G06K 9/6234; G06K 9/4628
See application file for complete search history.

(56) References Cited

U.S. PATENT DOCUMENTS

| 9,665,906 B2* | 5/2017 | Adeyoola | ........... G06F 3/04842 |
| 2016/0180433 A1* | 6/2016 | Adeyoola | ........... G06F 3/04842 |
| | | | 705/26.62 |

(Continued)

FOREIGN PATENT DOCUMENTS

| CN | 108010049 A | 5/2018 |
| CN | 109685067 A | 4/2019 |

OTHER PUBLICATIONS

Singh et al. "Automatic Trimap and Alpha-Matte Generation For Digital Image Matting" 2013 Sixth International Conference on Contemporary Computing (IC3), Aug. 8-10, 2013<br>.*

(Continued)

*Primary Examiner* — Mia M Thomas
(74) *Attorney, Agent, or Firm* — Muncy, Geissler, Olds & Lowe, P.C.

(57) ABSTRACT

The invention belongs to the field of computer vision technology, and provides a fully automatic natural image matting method. For image matting of a single image, it is mainly composed of the extraction of high-level semantic features and low-level structural features, the filtering of pyramid features, the extraction of spatial structure information, and the late optimization of the discriminator network. The invention can generate accurate alpha matte without any auxiliary information, saving the time for scientific researchers to mark auxiliary information and the interaction time when users use it.

1 Claim, 5 Drawing Sheets

(51) Int. Cl.
  *G06T 7/11*   (2017.01)
  *G06T 7/194*  (2017.01)

(52) U.S. Cl.
  CPC .... *G06T 7/194* (2017.01); *G06T 2207/10024* (2013.01); *G06T 2207/20081* (2013.01); *G06T 2207/20084* (2013.01)

(56) References Cited

U.S. PATENT DOCUMENTS

2017/0278246 A1* 9/2017 Kim .......................... G06T 7/11
2018/0253865 A1* 9/2018 Price ...................... G06N 3/084
2020/0357142 A1* 11/2020 Aydin ...................... G06N 3/08
2021/0027470 A1* 1/2021 Lin .......................... G06N 3/04

OTHER PUBLICATIONS

Lin et al. "RefineNet: Multi-Path Refinement Networks for High-Resolution Semantic Segmentation" 2017 IEEE Conference on Computer Vision and Pattern Recognition (CVPR), vol. 1, pp. 5168-5177.*

* cited by examiner

FULLY AUTOMATIC NATURAL IMAGE MATTING METHOD

TECHNICAL FIELD

The invention belongs to the field of computer vision technology and relates to a deep learning method for fully automatic natural image matting.

BACKGROUND

How to seamlessly combine a foreground object with another image to create a new image, the most critical technology is image matting. With the development of society and the continuous progress of technology, the number of images around us is exponential growth has also been accompanied by numerous image processing technologies. From the initial image classification to target detection, to image segmentation, etc., behind them all hide the needs of people to liberate their hands and reduce labor, and these needs are solved through different image processing technologies to facilitate our lives.

Image matting is a more important task in computer vision. It is based on image segmentation, but it extends the image segmentation deeply. Image segmentation aims to segment different regions or regions of interest in the image. It is essentially a non-zero or one binary classification problem. It does not require too much detail on the edge of the segment, while the image matting not only divides the foreground area, it also requires a higher degree of fineness of the segmented objects, such as human hair, animal feather, dense meshes and translucent objects, etc. This high-precision segmentation result is of great significance for image synthesis. It can be used in applications such as daily portrait change backgrounds, as well as in the field of virtual background production in the movie industry and fine parts production in the industrial world.

Image matting and image synthesis are essentially reversible processes, and the mathematical model can be expressed by the following formula:

$$I_z = \alpha F_z + (1-\alpha) B_z, \alpha \in [0,1] \quad (1)$$

Where the $z=(x, y)$ denotes the position of pixel in the image I, F and B refer to the foreground and background values at pixel z, respectively, $\alpha$ represents the degree of opacity of the pixel, and its value is between 0 and 1, which is essentially a regression problem. The formula gives an intuitive explanation for image synthesis, that is, an image is composed of many pixels, and each pixel is composed of different weighted sums of the foreground and background, and $\alpha$ is the weighting factor. When $\alpha=1$, it means completely opaque, that is, this pixel is only composed of the foreground. When $\alpha=0$, it means that it is completely transparent, that is, this pixel is only composed of the background. When $\alpha \in [0,1]$, it means that the pixel is a weighted sum of the foreground and background. The area where this pixel is located is also called the unknown area or the transition area.

Looking back at Formula 1, it can be seen that image matting is an under-constrained problem. For an RGB color image, there are 7 unknowns but only 3 knowns. Therefore, some existing methods solve this ill-posed problem by adding some additional auxiliary information (such as Trimap, Scribble strokes). In these auxiliary information, the alpha value of some regions is usually manually specified. Of course, with the development of science and technology, research on image matting technology and related fields has also continuously made new breakthroughs. There are many types of algorithms in the field of image matting, which can be roughly divided into the following three types.

(1) Sampling-Based Methods

The sampling-based method is mainly to sample the known foreground and background areas to find the candidate colors of the foreground and background of a given pixel, and then use different evaluation indicators to determine the optimal weighted combination of foreground and background pixels. Different sampling methods also have different effects on the weighted combination of pixels, including sampling pairs of pixels along the boundary of the unknown area, sampling based on ray projection, sampling based on color clustering, etc. The evaluation index here is used to make decisions among the sampling candidates. It mainly includes methods such as the reconstruction error of Formula 1, the distance from pixels in the unknown area, and the similarity measurement of foreground/background sampling.

(2) Propagation-Based Methods

In the propagation method, $\alpha$ in formula 1 is allowed to propagate the value of pixels of known $\alpha$ to pixels of unknown $\alpha$ through different propagation algorithms. The most mainstream of the propagation algorithm is to make a local smooth assumption on the foreground/background, and then find the globally optimal alpha matte by solving the linear sparse equations. Other methods include random walk and non-localized propagation.

(3) Deep-Learning Based Methods

With the rapid development of deep learning, more and more methods based on deep learning in the visual field such as image classification and semantic segmentation have surpassed the traditional image processing technology, and the application of deep learning technology in the field of image matting makes the final image synthesis. The quality of the image has been greatly improved. The laboratory of Professor Jia Jiaya of the Chinese University of Hong Kong has proposed a deep automatic portrait matting, which not only considers the semantic prediction of images, but also considers the optimization of pixel-level alpha mattes. During implementation, the input image is first segmented into foreground, background and unknown regions through semantic segmentation, and then a novel mask layer is proposed to enable feedforward and feedback operations for the entire network. This end-to-end deep learning method makes the method does not require any user interaction, while ensuring accuracy while greatly reducing manual labor. Recently, the laboratory of Professor Xu Weiwei from Zhejiang University proposed a Late-fusion method. From the perspective of classification, the problem of image matting is divided into coarse classification of foreground and background and edge optimization. In the implementation, first perform two classification tasks on an image, and then use multiple convolutional layers to perform a fusion operation. The difference between it and deep portrait segmentation is that deep portrait segmentation uses the traditional propagation method to perform the bridge training process, while Late-fusion uses a full convolution method to train in stages.

SUMMARY

In view of the shortcomings of the existing methods, the present invention proposes a full-automatic image matting framework based on attention-guided hierarchical structure aggregation. This framework can obtain a finer alpha matte when only a single RGB image is input without any additional auxiliary information. The user inputs a single RGB image to the network, firstly through a feature extraction network with an atrous pyramid pooling module to extract the features of the image, and then through a channel attention module to filter the advanced features, After that, the filtered results and low-level features are sent to the spatial attention module to extract the image details. Finally, the obtained mask and supervised ground truth as well as the original image are sent to the discriminator network for later optimization, and a fine alpha matte is finally obtained.

The technical solution of the present invention:

A fully automatic natural image matting method, which obtains an accurate alpha matte of foreground object from a single RGB image without any additional auxiliary information. The method consists of four parts, and the overall pipeline is as shown in the FIG. 1, the specific steps are as follows:

(1) Hierarchical Feature Extraction Stage

The hierarchical feature extraction stage mainly extracts different hierarchical feature representation from the input image. Here we select the ResNext as our basic backbone and divide it into five blocks. The five blocks from shallow to deep. The low-level spatial features and texture features are extracted from shallow layer, while the high-level semantic features are extracted from deep layers. With the deepening of the network, the network itself learn more deep semantic features, so the second block is used to extract low-level features. FIG. 2 shows the structurally related information of the image. At the same time, in order to allow the deep network to obtain a larger receptive field, we first change the ordinary convolution operation of the fifth block to a dilation convolution with a dilation rate of 2. In addition, in order to solve the problem of different sizes of foreground objects in the image, we send the advanced semantic features extracted from the fifth block to the Atrous Spatial Pyramid Pooling module. For the dilation convolution with different dilation rate, the dilation rates are set to 6, 12 and 18. Then concatenate the results of these five parallel operations to obtain a high-level semantic feature representation through a 3×3 convolution operation.

(2) Pyramidal Feature Filtration Stage

After extracting the high-level semantic feature representation, the traditional method usually does not filter the entire feature representation for the next step. Since there are more than one type of object in the image, there is more than one semantic information activated on the upper layer, and objects in the foreground and background are likely to be activated (that is, different channels are different for the responding objects), which will cause great trouble to image matting. The present invention proposes a pyramid feature filtering module (that is, channel attention in hierarchical attention). The present invention proposes a pyramid feature filtering module (that is, channel attention in hierarchical attention). The specific process is shown in FIG. 4. The obtained high-level semantic features are first subjected to a maximum pooling operation, so that each layer of Multiple feature values are compressed into one feature value. Then the compressed feature value is passed through a shared multi-layer perceptron composed of three-layer convolution operation to update the feature value between multiple channels. Finally, the elements of each channel in the channel attention graph obtained by the nonlinear activation function are multiplied with all the elements of the channel corresponding to the high-level semantic features of the previous stage, so as to achieve the selection of different activation regions. The mathematical expression is as follows:

$$\text{Output} = \sigma(\text{MLP}(\text{MaxPool}(\text{Input}))) \times \text{Input} \tag{2}$$

the input represents the advanced semantic features obtained in the first stage, σ represents the non-linear activation function, the size of the channel attention map obtained after σ is 1×1×n, n represents the number of channels, and the size of the obtained advanced semantic features is x×y×n, x and y represent the length and width of the channel, and the two will perform the broadcast operation when they are multiplied, × refers to the multiplication operation of the channel attention map and advanced semantic features.

(3) Appearance Cues Filtration Stage

Existing learning-based methods directly upsample the selected advanced semantic features to obtain the final alpha matte, which will largely lose the details and texture information of the foreground objects at the edges. In order to improve the fineness of the alpha matte at the edges of objects (such as hair, translucent glass, mesh), the present invention proposes a appearance cues filtration module (that is, spatial attention in the hierarchical attention). As shown in the FIG. 5, the appearance cues filtration module is proposed to take the updated advanced semantic features together with the spatial features and texture features extracted from the second block in the hierarchical feature extraction stage as input, and use the updated advanced semantic features as guidance information to extracted spatial cues from the spatial information and texture features related to the foreground object selectively. Specifically, append a convolution operation on the feature map of updated high-level semantic which consist of a 3×3 convolution layer followed by BatchNorm and ReLU layers, and then the result of this operation is then convoluted from two directions. One is to first perform a 7×1 convolution in the horizontal direction. On the basis of the result, 1×7 convolution in the vertical direction; the other is to first perform a 1×7 convolution in the vertical direction. On the basis of the result, 7×1 convolution in the horizontal direction. Finally, the results of two parallel but different convolution operations are concatenated, and this method is used to further filtrate and filter the updated high-level semantic features. Then perform a 1×1 convolution operation on the result to achieve deep fusion, and then obtain a spatial attention map through a nonlinear activation function. Subsequently, a multiplication operation is performed between the spatial attention map and the low-level features to update the low-dimensional features. The updated low-level features undergo a concatenation operation with the updated high-level semantic features after a 3×3 convolution. The fusion features of the two then undergo a 3×3 convolution to obtain the output at this stage. To ensure the consistency of the final alpha matte and Ground Truth, we design a hybrid loss function consisting of structural similarity error and mean square error, the mean square error is used to supervise the comparison between the alpha matte and the supervised ground truth, the expression is as follows $$L_{MSE} = \frac{1}{|\Omega|} \sum_i^\Omega (\alpha_p^i - \alpha_g^i)^2, \; \alpha_p^i, \alpha_g^i \in [0,1] \tag{3}$$

Ω represents the set of pixels, |Ω| represents the number of pixels in an image, $\alpha_p^i$ and $\alpha_g^i$ denotes the alpha matte value and supervised ground truth at pixel i. The structural similarity error ensures the consistency of spatial information and texture information extracted from low-level features to further improve the structure of foreground objects. The calculation formula is as follows:

$$L_{SSIM} = 1 - \frac{(2\mu_p\mu_g + c_1)(2\sigma_{pg} + c_2)}{(\mu_p^2 + \mu_g^2 + c_1)(\sigma_p^2 + \sigma_g^2 + c_2)} \quad (4)$$

$\alpha_p{}^i$ and $\alpha_g{}^i$ denotes the alpha matte value and supervised ground truth at pixel i, $\mu_p$, $\mu_g$ and $\sigma_p$, $\sigma_g$ represents the mean and variance of $\alpha_p{}^i$ and $\sigma_g{}^i$.

(4) Later Refinement Stage

In order to make the generated alpha matte more closely match the supervised ground truth in visual effect, a discriminator network is used in the later refinement stage. As shown in the FIG. 1, the obtained alpha matte, input image and supervised ground truth are sent to the discriminator network together, the discriminator network will determine the concatenation of supervised ground truth and input image as the standard to judge the concatenation of the generated alpha matte and the input image. Even it is a just slight difference between the alpha matte and the supervised ground truth information, will return a false, until the two are completely consistent, the discriminator will return true. Through the discriminator to further optimize the visual quality of the alpha matte, in the image synthesis to get a more realistic rendering.

The beneficial effect of the present invention: Compared with the existing image matting method, the biggest advantage of the present invention is that it does not require any auxiliary information and any additional user interaction information, and only needs to input an RGB image to obtain a fine alpha matte. On the one hand, it saves a lot of time for scientific researchers, and it is no longer necessary to manually make auxiliary information such as trimaps or scribbles, on the other hand, for users, they no longer need to manually mark some foregrounds/backgrounds when using them. At the same time, the hierarchical structure fusion method based on attention guidance in the present invention has enlightening significance for the task of image matting. It can get rid of the dependence on auxiliary information and ensure the accuracy of the alpha matte. This idea of high-level guiding low-level learning has great reference value to other computer vision tasks.

DETAILED DESCRIPTION

Figure 6:
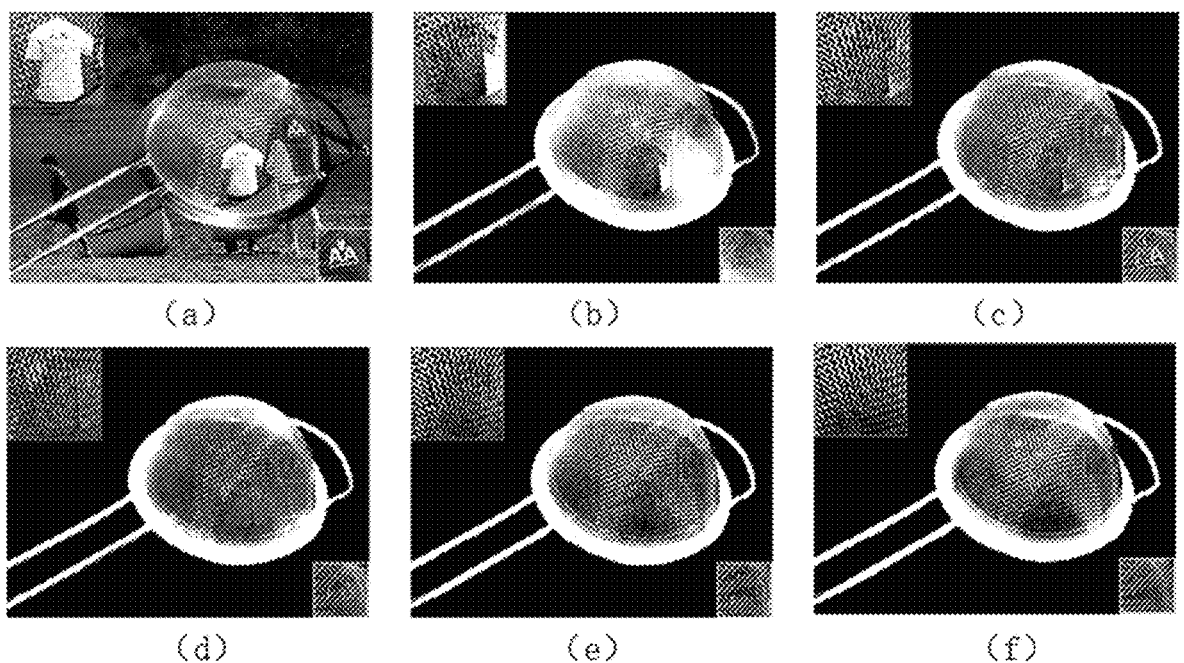
FIG. 6 is a comparison of the effects of different components. (a) is the original input image; (b) is the alpha matte obtained by only including the feature extraction network and the atrous pyramidal pooling; (c) is the alpha matte obtained by the pyramid feature filtering module that based on (b). (d) is the alpha matte obtained by adding the appearance cues filtration module on the basis of (c). (e) is the result obtained by the entire framework; (f) For supervised ground truth.

The specific embodiments of the present invention are further described below in conjunction with the drawings and technical solutions. In order to better compare the contribution of different components to the entire framework, we make a visual illustration according to FIG. 6. (a) is the original input image; (b) is the alpha matte obtained by only including the feature extraction network and the atrous pyramidal pooling; (c) is the alpha matte obtained by the pyramid feature filtering module that based on (b). (d) is the alpha matte obtained by adding the appearance cues filtration module on the basis of (c). (e) is the result obtained by the entire framework; (f) For supervised ground truth. For the convenience of description, we call the model corresponding to (b) the reference network. After the original image (a) is sent to the reference network, it can be seen from the results that there are a lot of grays in the foreground color. There is a sudden change in color. When the pyramid feature filtering module is added to the reference network (b), the results obtained clearly show that there is a significant improvement in the middle area, especially the clothes of the two people in the figure, but the mesh details at the edges Fuzzy. At the same time, only after adding the spatial information extraction module to the reference network, it can be seen from Figure (d) that the mesh transparency information at the edge has been improved very well, but the background information of the people in the middle still exists too much; Immediately after adding the pyramid feature filtering module and the spatial information extraction module to the reference network (b), as shown in (e), we get our final renderings. As can be seen from the changes of the masks in this series, the letters in the background area and the clothes gradually disappear as the components are added, while the foreground mesh and its edges become more and more refined. This can further confirm the importance and indispensability of each of our modules to improve performance.

Figure 1:
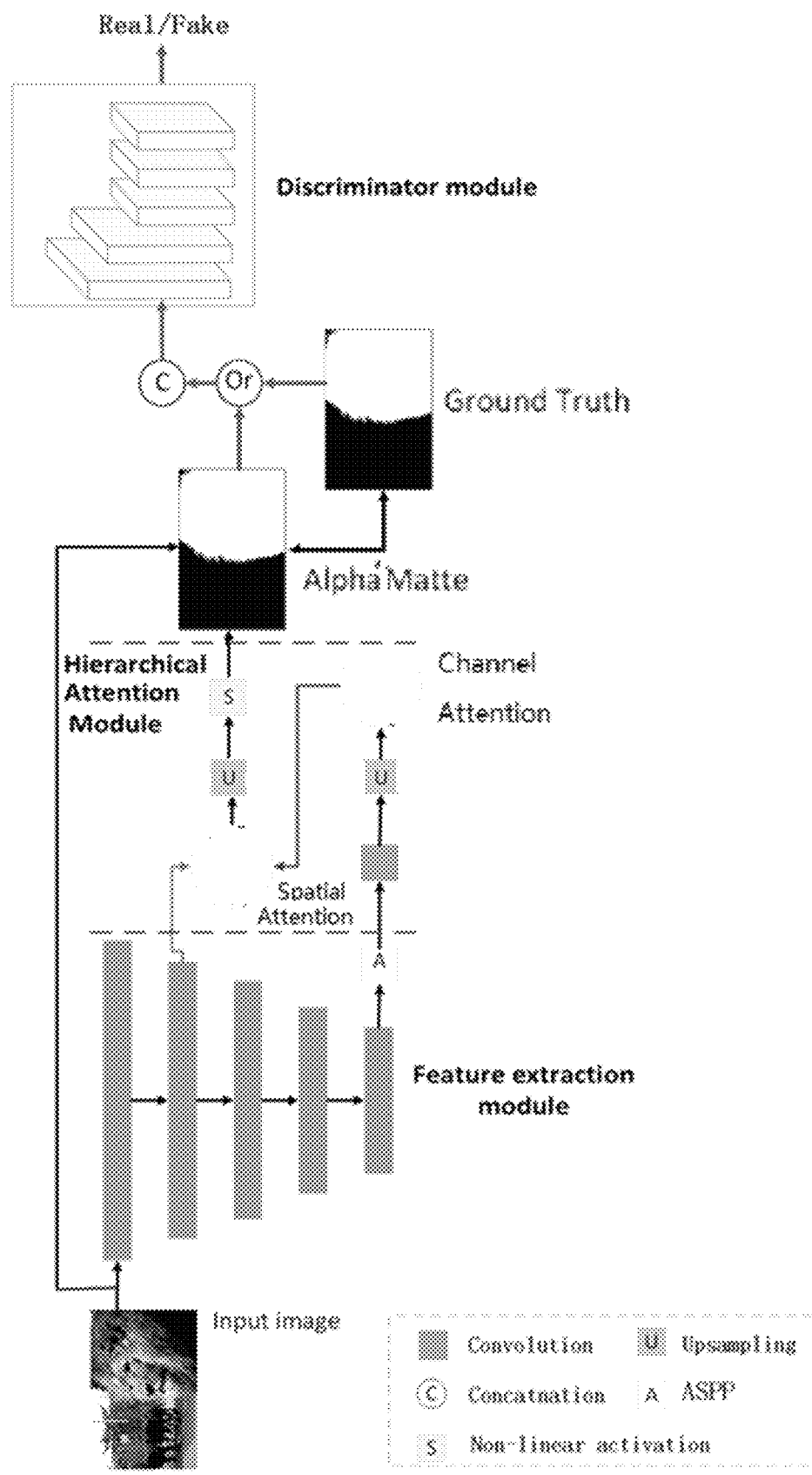
FIG. 1 is the pipeline of the overall framework
Figure 2:
FIG. 2 is the display diagram of the original input image and its corresponding low-level feature representation.
Figure 3:
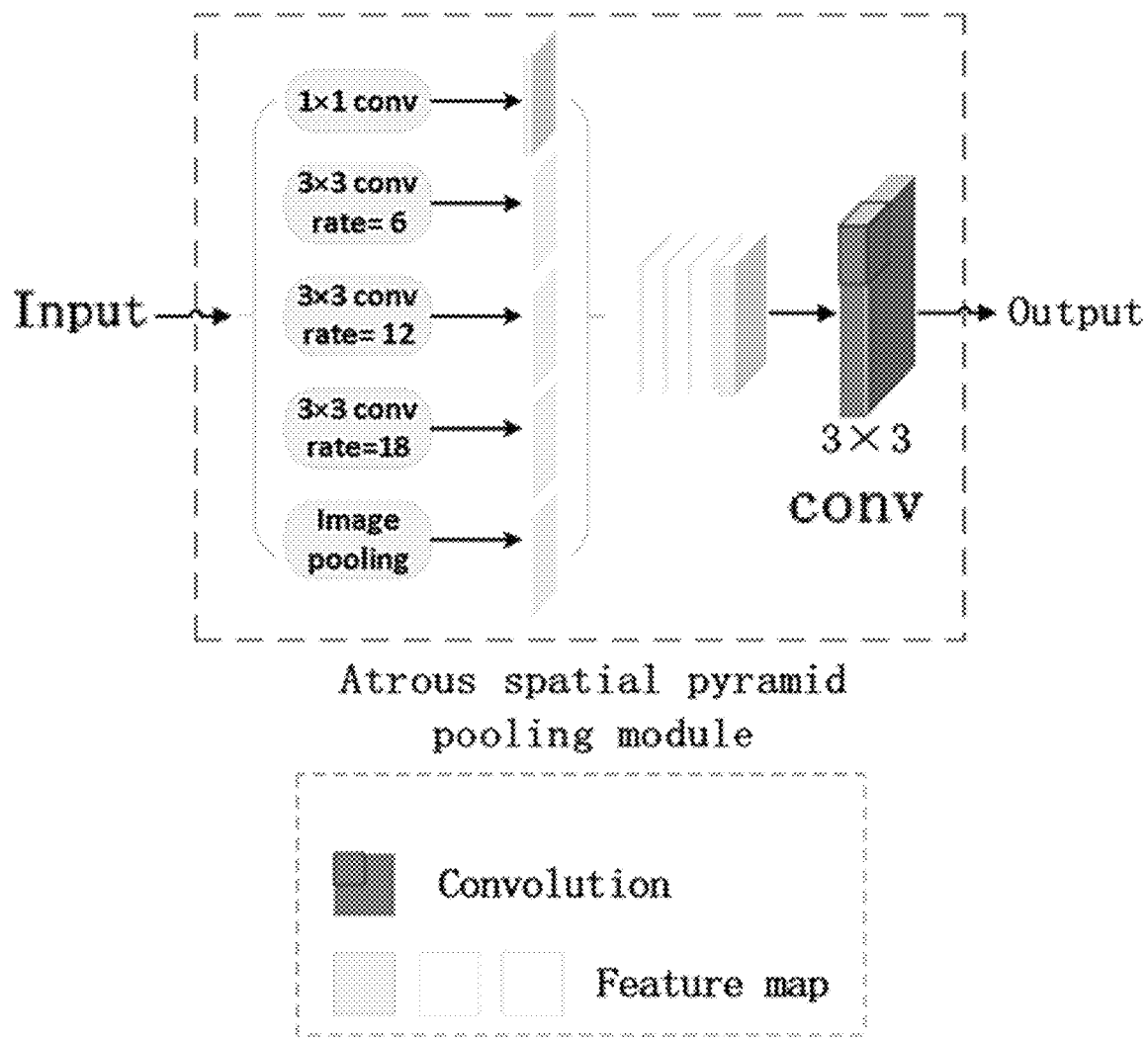
FIG. 3 is the display diagram of the atrous pyramidal pooling module.
Figure 4:
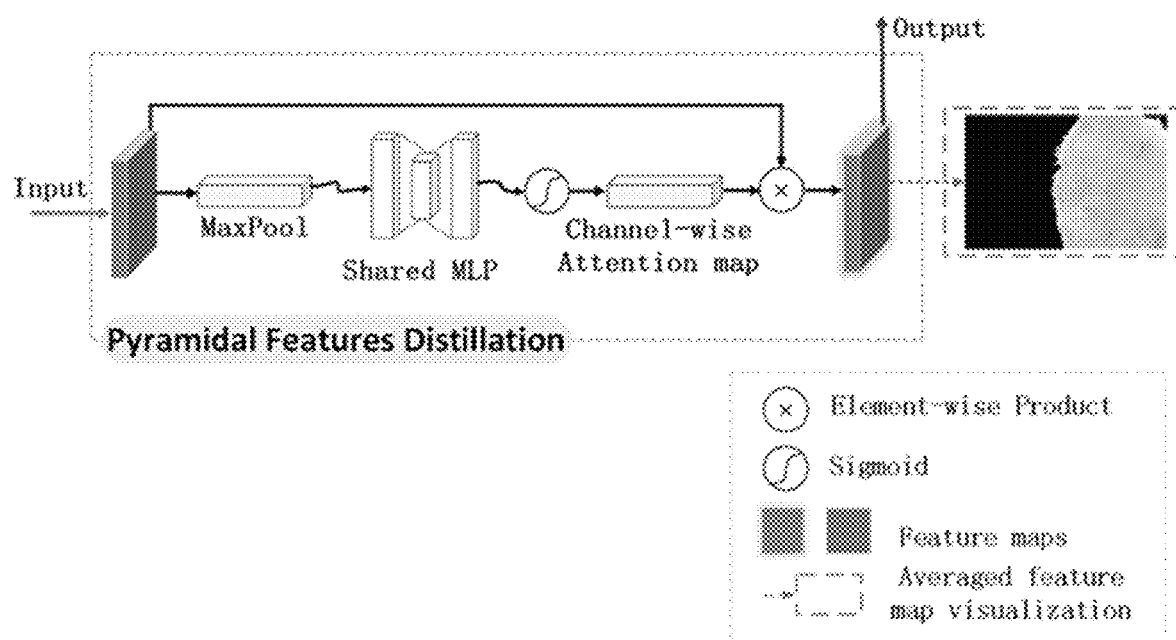
FIG. 4 is the display diagram of the pyramidal feature filtration module.
Figure 5:
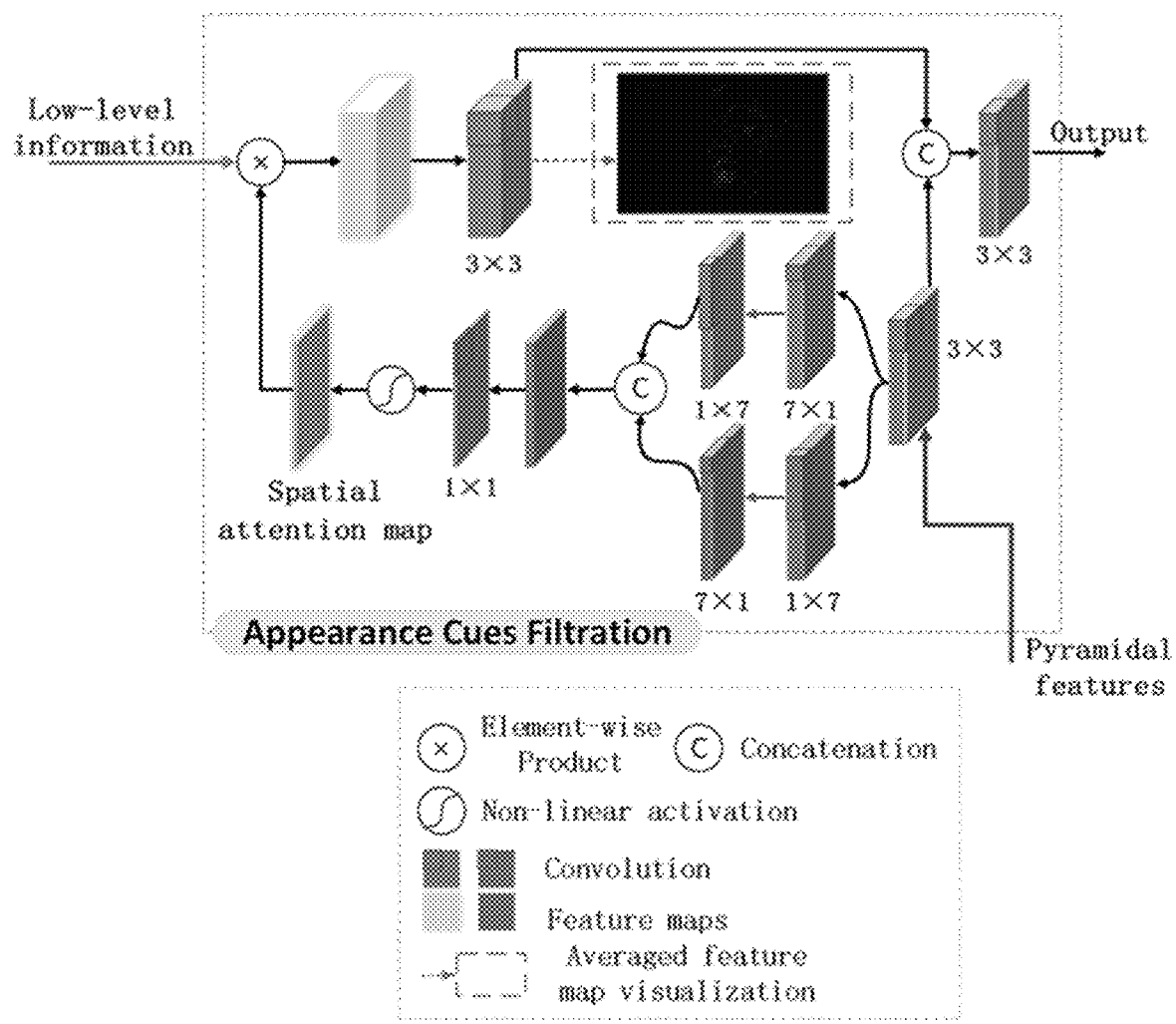
FIG. 5 is the display diagram of the appearance cues filtration module.

The core of the present invention lies in the fusion of attention-guided hierarchical structure, which will be described in detail in conjunction with the specific implementation. The invention is divided into four parts. The first part uses the feature extraction network and the atrous pyramidal pooling module to extract features of different levels, as shown in the overall framework pipeline of FIG. 1 and the atrous pyramidal pooling module of FIG. 3. The receptive field of each block of the feature extraction network is adjusted so that the final feature map of the network has a relatively large receptive field, avoiding being limited to a local region during the network learning process. The atrous pyramidal pooling module can perform feature extraction and fusion of different scales, and has stronger processing capabilities for objects of different scales and scales in the input picture. We treat the features after the atrous pyramidal pooling module as high-level semantic features. The features obtained by the second block in the feature extraction module are regarded as low-level structural features. The second part uses the pyramidal feature filtering module to filtrate and filter advanced semantic features, as shown in FIG. 4. By adopting the attention mechanism, an attention operation is carried out on the feature maps with strong semantic information, so as to adaptively assign strong weights to the useful channels, and weaken the channels with less or even useless information. The third part uses the results of the previous stage as guidance information to the appearance cues filtration module for low-level structural feature extraction, and then merges the updated high-level semantic features and low-level structural features, as shown in FIG. 5. By using the appearance cues filtration module, the edge of the foreground object is well optimized. With the feature map of the previous stage as a guide, the features that are not related to the foreground in the low-dimensional information can be filtered out at this stage, focusing on the foreground Edge features, the final filtered high-level semantic features and the extracted low-level structural features are fused to obtain the final result. The fourth part further optimizes the obtained alpha matte through the discriminator network to make its visual effect more consistent with the supervised ground truth information, as shown in FIG. 1. With the help of the discriminator, the prediction result and the original image are used as a set of inputs, and the supervision information and the original image are used as another set of inputs. These two sets of inputs are sent to the discriminator at the same time, which can make the discriminator supervise the network prediction results. Good or bad, and then achieve the purpose of optimizing visual effects.

The invention claimed is:

1. A fully automatic natural image matting method, which obtains an alpha matte from a single RGB image without any additional auxiliary information, wherein the steps are as follows:

a hierarchical feature extraction stage;

wherein the hierarchical feature extraction stage extracts different hierarchical feature representations from input images; ResNext is selected as a basic backbone algorithm and is divided into five blocks, the five blocks from shallow to deep; low-level spatial features and texture features are extracted from a shallow layer, while high-level semantic features are extracted from deep layers; with deepending of network, the network itself learns more deep semantic features, so a second block is used to extract low-level features; calculating a deep network in order to obtain a larger receptive field, changing an ordinary convolution operation of the fifth block to a dilation convolution operation with a dilation rate of 2; in order to solve the problem of different sizes of foreground objects in the image, calculating advanced semantic features extracted from the fifth block sent to an Atrous Spatial Pyramid Pooling module; for the dilation convolution with different dilation rates, the dilation rates are set to 6, 12 and 18; then concatenate the results of these five parallel operations to obtain a high-level semantic feature representation through a 3×3 convolution operation;

a pyramidal feature filtration stage;

wherein the pyramidal feature filtration stage will first obtain the advanced semantic features through a Max Pooling operation, thereby compressing multiple feature values of each layer into one feature value, and then passing the compressed featurevalue through a three-layer convolution operation to update the shared multi-layer perceptron feature values between multiple channels, wherein the elements of each channel in a channel attention map obtained by a nonlinear activation function and all the elements of the channel corresponding to the high-level semantic features of the previous stage carry out the multiplication operation to achieve the selection of different active areas:

Output=σ(MLP(MaxPool(Input)))×Input wherein the input images represents the advanced semantic features obtained in the first stage, a represents the nonlinear activation function, the size of the channel attention map obtained after a is 1×1×n, n represents the number of channels, and the size of the obtained advanced semantic features is xxyxn, x and y represent the length and width of the channel, and the two perform a broadcast operation when they are multiplied, x represents the multiplication operation of the channel attention map and advanced semantic features;

an appearance cues filtration stage;

wherein a spatial information extraction module updates advanced semantic features together with the spatial features and texture features extracted from the second block in the hierarchical feature extraction stage as input, and use the updated advanced semantic features as guidance information to extracted spatial cues from the spatial information and texture features related to the foreground object selectively; append a convolution operation on the feature map of updated high-level semantic features which consist of a 3×3 convolution layer followed by BatchNorm and ReLU layers, and then the result of this convolution operation is then convoluted from two directions; one is to first perform a 7×1 convolution in the horizontal direction; on the basis of the result, 1×7 convolution in the vertical direction, the other is to first perform a 1×7 convolution in the vertical direction; on the basis of the result, 7×1 convolution in the horizontal direction; the results of two parallel but different convolution operations are concatenated, and this method is used to further filtrate and filter the updated high-level semantic features; then perform a 1×1 convolution operation on the results to achieve deep fusion, and then obtain a spatial attention map through a nonlinear activation function; subsequently, a multiplication operation is performed between the spatial attention map and low-level features to update the low-dimensional features; the updated low-level features undergo a concatenation operation with the updated high-level semantic features after a 3×3 convolution; the fusion features of the updated low -level features and the updated high-level semantic features then undergo a 3×3 convolution to obtain the output at this stage; to ensure the consistency of the final alpha matte and a supervised ground truth, a hybrid loss function consisting of structural similarity error and mean square error is designed, the mean square error is used to supervise the comparison between the alpha matte and the supervised ground truth, the expression is $$L_{MSE} = \frac{1}{|\Omega|} \sum_{i}^{\Omega} (\alpha_p^i - \alpha_g^i)^2, \alpha_p^i, \alpha_g^i \in [0, 1]$$

wherein, $\Omega$ represents a set of pixels, $|\Omega|$ represents the number of pixels in an image, $\alpha_p^i$ and $\alpha_g^i$ denotes the alpha mattevalue and supervised ground truth at pixel i; the structural similarity error ensures the consistency of spatial information and texture information extracted from low-level features to further improve the structure of foreground objects; the calculation formula is:

$$L_{SSIM} = 1 - \frac{(2\mu_p\mu_g + c_1)(2\sigma_{pg} + c_2)}{(\mu_p^2 + \mu_g^2 + c_1)(\sigma_p^2 + \sigma_g^2 + c_2)} \quad (4)$$

wherein, $\alpha_p^i$ and $\alpha_g^i$ denotes the alpha matte value and supervised ground truth at pixel i, $\mu_p$, $\mu_g$ and $\sigma_p$, $\sigma_g$ represents the mean and variance of $\alpha_p^i$ and $\alpha_g^i$;

a later refinement stage, calculated in order to make the generated alpha matte match the supervised ground truth in visual effect by a discriminator network; the obtained alpha matte, input images and supervised ground truth are sent to the discriminator network together, the discriminator network will determine the concatenation of supervised ground truth and input images as the standard to judge the concatenation of the generated alpha matte and the input images; calculating a difference between the alpha matte and the supervised ground truth information, will return a negative value, until the two are completely consistent, the discriminator will return a positive value; through the discriminator to further optimize the visual quality of the alpha matte, in the image synthe sis to obtain an improved rendering.

* * * * *